United States Patent
Naraghi (10) Patent No.: US 8,726,601 B2
(45) Date of Patent: May 20, 2014

(54) BUILDING FACADE SURFACE FOR SEASONAL SELECTIVENESS OF SOLAR IRRADIATION ABSORPTION AND REFLECTION

(71) Applicant: Mohammad Naraghi, Yorktown Heights, NY (US)

(72) Inventor: Mohammad Naraghi, Yorktown Heights, NY (US)

(*) Notice: Subject to any disclaimer, the term of this patent is extended or adjusted under 35 U.S.C. 154(b) by 0 days.

(21) Appl. No.: 13/948,779

(22) Filed: Jul. 23, 2013

(65) Prior Publication Data

US 2013/0305647 A1    Nov. 21, 2013

Related U.S. Application Data

(63) Continuation of application No. PCT/US2012/022390, filed on Jan. 24, 2012.

(60) Provisional application No. 61/435,407, filed on Jan. 24, 2011.

(51) Int. Cl.
 - *E04B 1/343* (2006.01)
 - *E04F 13/08* (2006.01)
 - *E06B 9/24* (2006.01)

(52) U.S. Cl.
 CPC ..... *E04F 13/0864* (2013.01); *E06B 2009/2417* (2013.01)
 USPC ...................................................... 52/573.1

(58) Field of Classification Search
 CPC . E04F 13/0864; E04F 13/0871; E04F 13/072; E04F 13/08; Y02B 10/20; E06B 2009/2417; E06B 2009/24
 USPC ...................................................... 52/573.1
 See application file for complete search history.

(56) References Cited

U.S. PATENT DOCUMENTS

| | | | |
|---|---|---|---|
| 3,001,331 A | 9/1961 | Brunton | |
| 4,217,742 A | 8/1980 | Evans | |
| 5,303,525 A * | 4/1994 | Magee | 52/306 |
| 5,680,734 A * | 10/1997 | Magee | 52/553 |
| 6,581,589 B1 * | 6/2003 | Fent et al. | 126/617 |
| 7,157,112 B2 | 1/2007 | Haines | |
| 7,866,107 B2 | 1/2011 | Conradi | |
| 8,028,691 B2 * | 10/2011 | Maxson et al. | 126/702 |
| 2006/0150558 A1 | 7/2006 | Conradi | |
| 2010/0101565 A1 | 4/2010 | Maxson et al. | |
| 2012/0008222 A1 | 1/2012 | Tseng | |

OTHER PUBLICATIONS

Office Action mailed Jul. 30, 2012 in related U.S. Appl. No. 13/357,038.

* cited by examiner

*Primary Examiner* — Mark Wendell
*Assistant Examiner* — Keith Minter
(74) *Attorney, Agent, or Firm* — Brian R. Pollack; Day Pitney LLP (57) ABSTRACT

Disclosed are various building facade surface configurations and related methods. An exemplary facade includes grooved cavities that are configured in a manner that reflects summer (cooling season) insolation and absorbs winter (heating season) insolation. The effective absorptivities of the exemplary facade for various cavity reflectance characteristics, i.e., a wide range of diffuse and specular reflectance characteristics, are evaluated using a Monte Carlo model. The calculations in an illustrated embodiment are performed for the latitude of 41° N where both heating and cooling loads are significant. Embodiments of facades and other structures are similarly within the scope of the disclosure for locations of different latitudes and longitudes.

20 Claims, 13 Drawing Sheets

FIG. 1

The solar altitude angle $\beta$, azimuth angle $\phi$ and zenith angle $\theta_Z$

FIG.2

Solar altitude angle versus azimuth angle for latitude of 41°N

Profile angle for a south facing facade at 41°N

FIG.5

Summer solar ray at minimum projection angle perpendicular to the highly reflective surface

FIG.6

Solar irradiation rays shown with equally spaced rays arriving at a typical cavity groove

FIG.7

The average number of bounces versus the profile angle for solar rays based on specular, specular-diffuse and diffuse reflections

FIG.8

Effective absorptivity versus profile angle for cavity surface absorptivity and tip absorptivity of 0.05.

FIG.9

Effect of cavity depth on the number of bounces when cavity surface is 100% diffuse

FIG.10

Effect of cavity depth on the number of bounces when cavity surface is 50% diffuse and 50% specular.

FIG. 11

Effect of cavity depth on the number of bounces when cavity surface is 25% diffuse and 75% specular

FIG.12

Effect of cavity depth on the number of bounces when cavity surface is 100% specular

FIG.13

Effect of angle $\gamma_2$ on the number of bounces when cavity surface is 100% diffuse

FIG.14

Effect of angle $\gamma_2$ on the number of bounces when cavity surface is 50% diffuse and 50% specular

FIG.15

Effect of angle $\gamma_2$ on the number of bounces when cavity surface is 25% diffuse and 75% specular

FIG.16

Effect of angle $\gamma_2$ on the number of bounces when cavity surface is 100% specular

BUILDING FACADE SURFACE FOR SEASONAL SELECTIVENESS OF SOLAR IRRADIATION ABSORPTION AND REFLECTION

CROSS-REFERENCE TO RELATED APPLICATIONS

This patent application is a continuation of and claims the benefit of priority to International Patent Application No. PCT/US2012/022390, filed Jan. 24, 2012, which in turn claims the benefit of priority to U.S. Provisional Patent Application Ser. No. 61/435,407, filed Jan. 24, 2011. Each of the aforementioned patent applications is incorporated by reference herein in its entirety for any purpose whatsoever.

COPYRIGHT NOTICE

A portion of the disclosure of this patent document contains material which is subject to copyright protection. The copyright owner has no objection to the reproduction by anyone of the patent document or patent disclosure as it appears in the Patent and Trademark Office, patent file or records, but otherwise reserves all copyrights whatsoever.

BACKGROUND

1. Field of the Disclosure

The present disclosure relates to methods for improved building structures and the resulting structures. Particularly, the present disclosure is directed to improved techniques for configuring building surfaces, such as facades and roofs, as appropriate, to improve energy efficiency.

2. Description of Related Art

Based on the data presented by the Energy Information Administration, the greenhouse gases—primarily $CO_2$—emitted due to the energy consumption by buildings (combined commercial and residential buildings) exceeds other sectors (transportation and industrial). A good practice in the design of sustainable buildings is to make the maximum use of passive solar energy. The building facade is the first frontier that interacts with the solar irradiance; hence, it plays a significant role in absorption and reflection of solar irradiation. A large body of work has been generated to make external and internal components of fenestrations block solar irradiance during the cooling season (summers) and admit it during heating season (winters), see [1-3], reducing the buildings' heating and cooling energy consumptions. However, to the knowledge of Applicant, almost no research and development has been performed on the opaque part of the facade.

SUMMARY OF THE DISCLOSURE

The purpose and advantages of the present disclosure will be set forth in and become apparent from the description that follows. Additional advantages of the disclosed embodiments will be realized and attained by the methods and systems particularly pointed out in the written description hereof, as well as from the appended drawings.

To achieve these and other advantages and in accordance with the purpose of the disclosure, as embodied herein, the disclosure includes methods and structures that provide improved building facades, as well as vehicles and other structures.

In some embodiments, an exemplary facade surface configuration presented herein absorbs the maximum, or substantially the maximum, of solar energy received through the sun-facing opaque facade during heating season, while it reflects the sun's rays during cooling season (summers). This exploits the fact that the solar altitude angle for a given solar azimuth angle is larger during cooling season than that of heating season. The variations of the solar altitude, calculated based on trigonometric relations, clearly indicates that solar altitude angles for all latitudes are significantly larger during summer months than those for winter months, especially for locations that have significant heating and cooling seasons. For example, for New York City with average latitude of 41° N for most of the midday the solar altitude is larger than 60° for summer days while it is less than 40° for winter months. The foregoing principle can be applied to building roofs or other structures or even vehicles (e.g., cargo trailers, trains, cargo containers, other vehicles, etc.), as appropriate. While the present disclosure illustrates exemplary embodiments of a building facade for a latitude proximate New York City, it will be appreciated that the present disclosure encompasses facades for every latitude.

More generally, the disclosure provides a structure having a surface of a structure that is adapted and configured to reflect a majority of solar radiation in summer months by providing a reflective surface proximate an outside edge of a cavity in the surface of the structure, the reflective surface being adapted and configured to reflect solar radiation during summer months. The surface of the structure is preferably arranged to substantially prevent direct solar contact with the cavity during summer months. The surface of the structure is also preferably adapted to absorb solar radiation in winter months by permitting direct solar contact with at least a portion of the cavity, the cavity being adapted and configured to permit incident direct solar radiation to undergo multiple reflections within the cavity.

In some embodiments, the surface of the structure can be adapted and configured to reflect more direct solar radiation during summer months than during winter months. The surface of the structure can be optimized to reflect solar radiation during summer months and to absorb solar radiation in winter months for a preselected latitude. For example, the preselected latitude can be between about 35° N and about 45° N, between about 35° S and about 45° S, between about 30° N and about 35° N, between about 30° S and about 35° S, between about 45° N and about 55° N or between about 45° S and about 55° S, among others. The preselected latitude can be about 30° N, about 35° N, about 40° N. In some embodiments, the surface of the structure configured as described herein can be, for example, a building facade, a roof of a building, a storage tank (e.g, oil tank, liquefied natural gas ("LNG") tank, water tank), a portion of a pipeline (e.g. oil or natural gas pipeline), a shipping container, a surface of a vehicle (e.g., train, cargo trailer, car, truck, etc.), and the like.

In some embodiments, the cavity can have a substantially rectangular cross section, such as one defined at least in part by two substantially parallel walls. If desired, the substantially parallel walls can converge along a direction pointing into the structure. In some embodiments, the cavity can have a substantially curved cross section, such as a substantially hyperbolic cross section, an undulating cross section, or the like. If desired, the surface of the structure can further include a layer of transparent or translucent material covering the cavity. The transparent or translucent material can include glass, plastic and the like. The cavity can have a surface having any desired surface finish, such as any finish prescribed by SPI//SPE, or any other surface finish.

In further aspects, the disclosure provides a method of making a passively solar selective surface. The method includes determining a solar altitude angle range for winter months for a surface (e.g., of a structure), determining a solar altitude angle range for summer months for the surface, and defining at least one cavity in the surface. The at least one cavity is substantially aligned with the solar altitude angle range for winter months, and substantially out of alignment with the solar altitude angle range for summer months. The method can further include defining a reflective surface proximate an edge of the at least one cavity, the reflective surface being adapted and configured to reflect more solar radiation during summer months than during winter months. In some embodiments, the solar altitude ranges can correspond to a latitude between about 35° N and about 45° N, or any other desired latitude.

The disclosure also provides a machine readable program containing instructions for controlling a system for designing a passively solar selective surface. The program includes means for determining a solar altitude angle range for winter months for the surface (e.g, of a structure), means for determining a solar altitude angle range for summer months for the surface, and means for defining at least one cavity in the surface, the at least one cavity being substantially aligned with the solar altitude angle range for winter months, and substantially out of alignment with the solar altitude angle range for summer months.

The program can further include means for receiving latitude input, wherein the program further includes means for computing the solar altitude angle ranges based at least in part on the latitude input. The program can further include means for receiving longitude input, wherein the program can include means for computing the solar altitude angle ranges based at least in part on the longitude input. The cavity can be adapted and configured to cause multiple internal reflections of incident solar radiation. The cross sectional shape of the cavity can be defined by way of a Monte Carlo approach, among others.

It is to be understood that both the foregoing general description and the following detailed description are exemplary and are intended to provide further explanation of the embodiments disclosed herein. The accompanying drawings, which are incorporated in and constitute part of this specification, are included to illustrate and provide a further understanding of the method and system of the disclosure. Together with the description, the drawings serve to explain the principles of the disclosed embodiments.

DETAILED DESCRIPTION

Reference will now be made in detail to the present preferred embodiments of the disclosure, examples of which are illustrated in the accompanying drawings. The methods and corresponding steps of the disclosed embodiments will be described in conjunction with the detailed description of the system.

Figure 1:
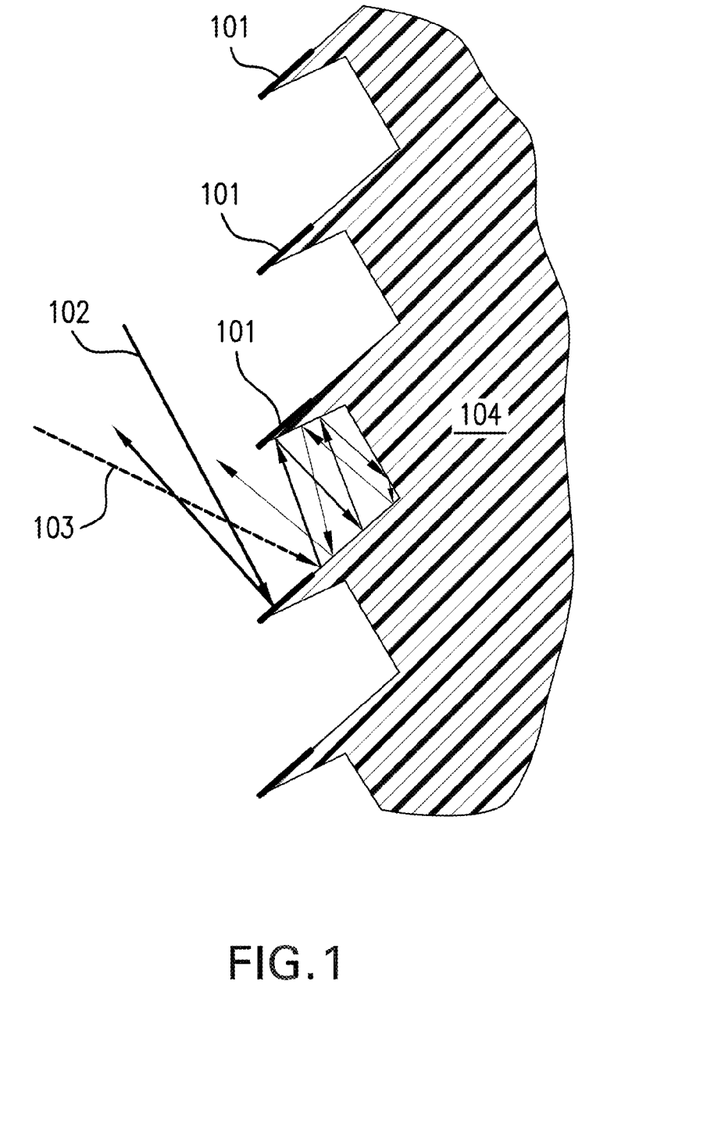
FIG. 1 is a schematic illustration various aspects of a surface configured in accordance with the disclosure.

FIG. 1 shows exemplary schematics of an exemplary seasonally selective grooved facade 104 with two direct solar rays 102, 103 relating to summer and winter. The grooved cross-section is such that it reflects most of the solar irradiance 102 at large solar altitude angles (corresponding to summer). For this case, the solar irradiance 102 makes one reflection from the highly reflective surface 101 at the upper tip of the lower surface of the groove. When the solar altitude angle is small (winter solar altitude angle), the reflected solar irradiance 103 enters the groove cavity. This will result in multiple reflections of solar irradiation within the cavity. At each reflection the likelihood of absorption is the same as absorptivity of the cavity surface. For example, if the absorptivity is 0.5 there is 50% chance that it is absorbed by the surface at each reflection (bounce).

The more reflection that the solar radiation beam makes from the cavity surface, the more likely it is that the beam gets absorbed by the surface. The effective absorptivity of a surface with cavity can be evaluated by [4 and 5]:

$$\alpha_{eff} = 1 - \rho^n \tag{1}$$

where $\rho$ is the groove cavity reflectivity and n is the number of bounces (reflections).

Table 1 shows the effective absorptivity of a cavity as a function of cavity surface absorptivity, which is calculated based on equation (1). The data in Table 1 show that after four reflections the effective absorptivity of the cavity becomes close to or larger than 0.9. The absorptivity of cavity surface in Table 1 ranges from 0.3 to 0.7, which is absorptivity of most building facade materials. Using an average cavity surface absorptivity of 0.5, the results in Table 1 indicate that at the forth bounce (reflection) more than 90% of the solar ray gets absorbed by the surface. If the cavity is made of material with lower reflectivity and higher absorptivity, the effective absorptivity becomes larger for the given number of bounces.

TABLE 1

Effective absorptivity of a cavity as a function of number of bounces and cavity surface reflectivity

| | n | | | | | | | |
|---|---|---|---|---|---|---|---|---|
| α | 1 | 2 | 3 | 4 | 5 | 6 | 7 | 8 |
| 0.3 | 0.30 | 0.51 | 0.66 | 0.76 | 0.83 | 0.88 | 0.92 | 0.94 |
| 0.4 | 0.40 | 0.64 | 0.78 | 0.87 | 0.92 | 0.95 | 0.97 | 0.98 |
| 0.5 | 0.50 | 0.75 | 0.88 | 0.94 | 0.97 | 0.98 | 0.99 | 1.00 |
| 0.6 | 0.60 | 0.84 | 0.94 | 0.97 | 0.99 | 1.00 | 1.00 | 1.00 |
| 0.7 | 0.70 | 0.91 | 0.97 | 0.99 | 1.00 | 1.00 | 1.00 | 1.00 |

Based on the preceding discussion, if the cavity is shaped in a manner that the solar radiation makes multiple reflections, approximately three to four (depending on the cavity reflectivity), most of its energy gets absorbed by the cavity and, for this case, the facade. The reflective characteristics of the cavity surface can be any combination of diffuse or specular reflection. A surface has specular reflection characteristics if it is very smooth and glossy, e.g. mirrors or glass. The real reflection from a surface is combination of both diffuse and specular. The distribution of reflected energy for a real surface is such that it spikes in the specular reflection direction but it also has a diffuse component (see references 6 and 7 for details of real surface reflectivity distributions). It is common in the radiation heat transfer literature, for the purpose of analysis, to treat the real reflectivity as a summation of diffuse and specular components [6 and 7], i.e., $$\rho = \rho^d + \rho^s \tag{2}$$

where $\rho^d$ and $\rho^s$ are diffuse and specular components of reflectivities, respectively. Depending on the type of surface, the specular or diffuse component of reflectivity dominates the overall surface reflectivity. For example, for glossy surfaces, the specular component of the reflectivity is large while the reflectivity of rough surfaces is closer to diffuse.

To determine the expected or average number of bounces that solar rays make inside the facade cavity a Monte Carlo approach can be implemented. In this method, a large number of solar rays at a specified direction and a random location are dispatched. Two random numbers decide the reflection direction for diffuse reflection. One number is for determining the zenith angle and the other one for determining the azimuth angle [6]. For the specular reflection there is no need to decide the reflection direction via random numbers; the reflection zenith and azimuth angles can simply obtained via: $\theta_r = \theta_i$ and $\theta_r = \theta_i + 180°$. A computer model and software program based on this method are thus provided and used to determine the average number of reflections of solar beam within the cavity for all possible solar angles. Having determined the average number of bounces, then the effective absorptivity of the cavity can be determined using equation (1).

Figure 2:
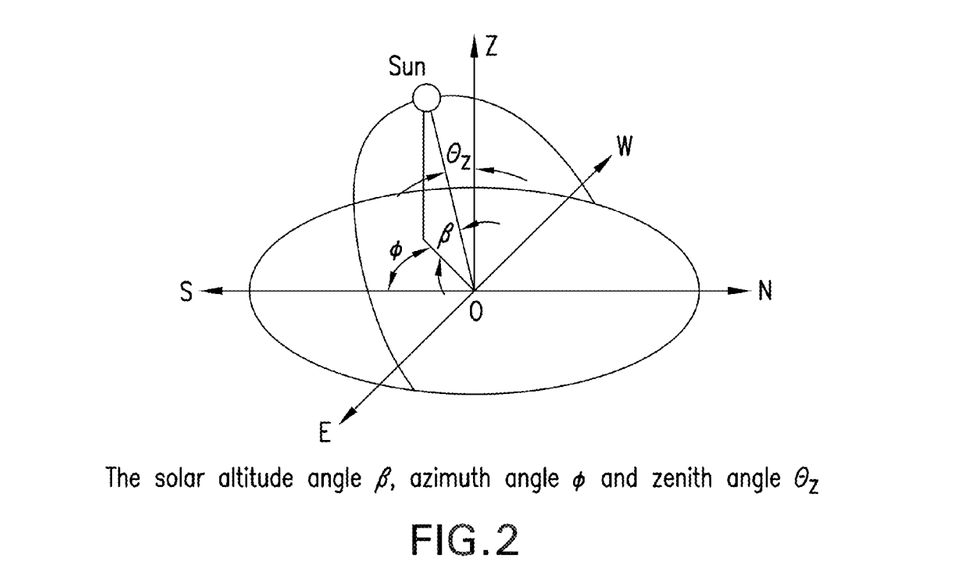
FIG. 2 is a schematic illustration showing various solar angles.
Figure 3:
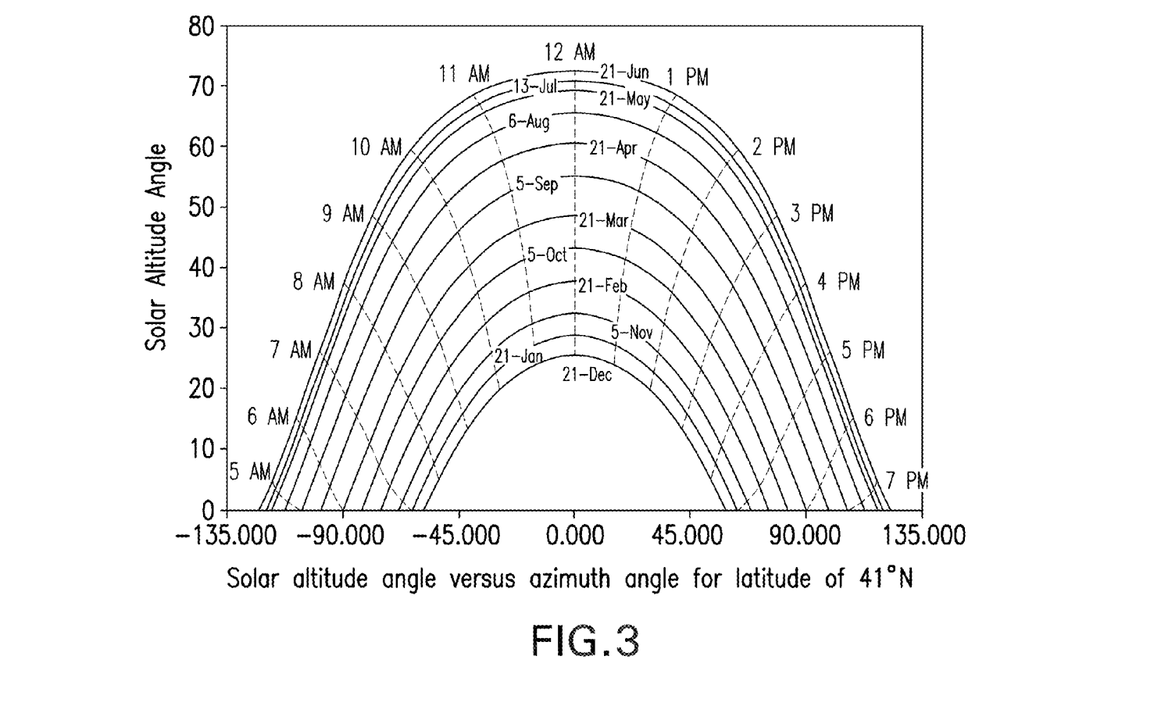
FIG. 3 is a graphic representation of solar azimuth and altitude angles.

The Sun's position in the sky is defined by two angles, solar altitude angle ($\beta$) and solar azimuth angle ($\phi$), as shown in FIG. 2. The solar altitude angle is the angle between the sun's ray and the projection of the ray on a horizontal surface. Solar altitude and azimuth angles change with the time and date, such that, the direction of solar beam arriving at a point can be specified by a line in a three dimensional coordinate and can be calculated in equations given in [5]. To demonstrate the variation of altitude and azimuth angles they are plotted for latitude of 41° N in FIG. 3. As shown in FIG. 3, the altitude angle does not exceed 40 degrees for winter months, and is greater than 60 degrees for summer months. It should be noted that buildings at the latitude of 41° N have a significant amount of both heating and cooling loads. Most locations with significant heating and cooling loads, such as in the northern hemisphere, are between latitudes of 38° N and 42° N.

Figure 4:
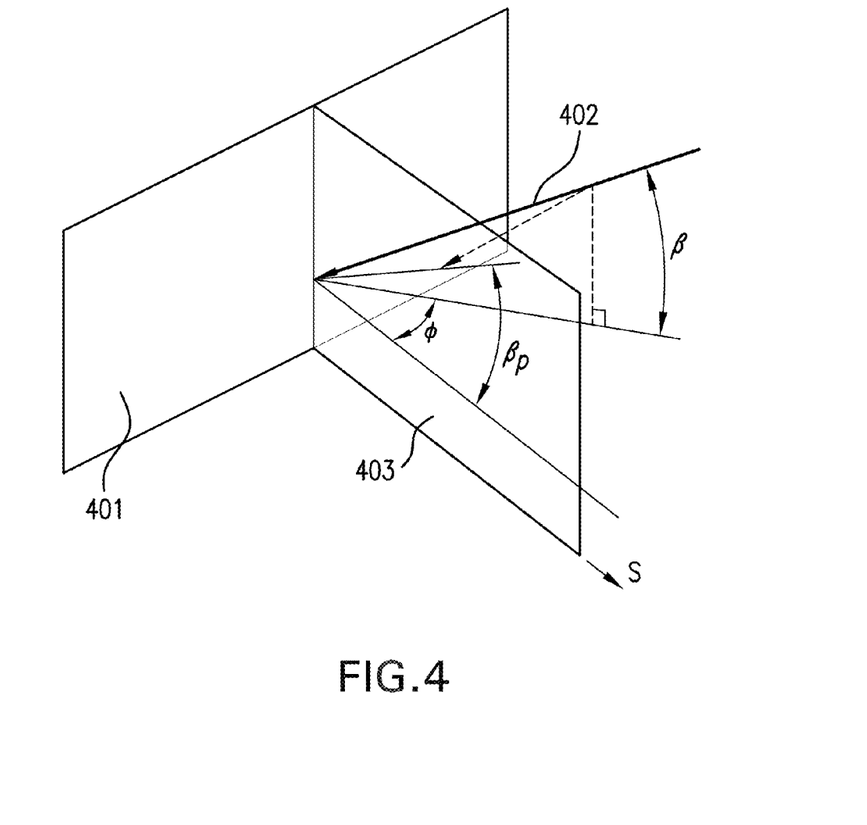
FIG. 4 is a further graphic representation of various solar angles.

To perform the analysis in a two-dimensional plane, the profile angle, which is a projected solar ray 402 on a plane 403 perpendicular to the south-facing facade 401 is used. The profile angle is calculated via the following equation:

$$\tan\beta_p = \frac{\tan\beta}{\cos\phi} \tag{3}$$

Figure 5:
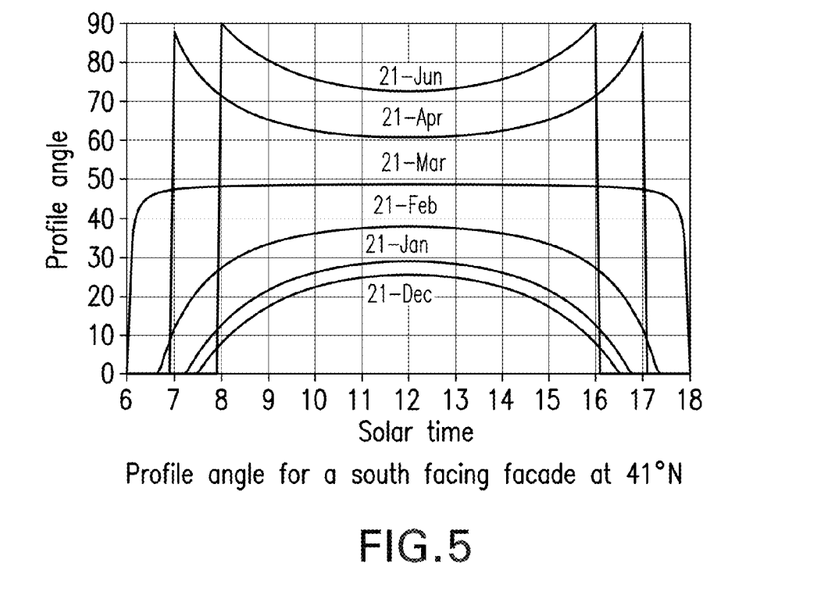
FIG. 5 is a graphic representation of profile angles for a south facing facade.

It is important to note that cos $\phi$ is always between zero and one. As a result, the profile angle $\beta_p$ is greater than or equal to the solar altitude angle $\beta$, i.e., $\beta_p \geq \beta$. The profile angle combines the altitude and azimuth angles into one angle making it possible to perform two-dimensional Monte Carlo analysis on the plane perpendicular to the facade. Although at early summer mornings, especially the month of August, the altitude angle ($\beta$) is very small, the profile angle ($\beta_p$) however, based on equation (3), is very large since cos $\phi$ is smaller than one. FIG. 5 depicts the profile angle versus solar time for a south-facing facade, which shows that the profile angle is larger than 60° for all summer months for latitude of 41° N. Also, profile angles are less than 40 degrees for winter months.

Figure 6:
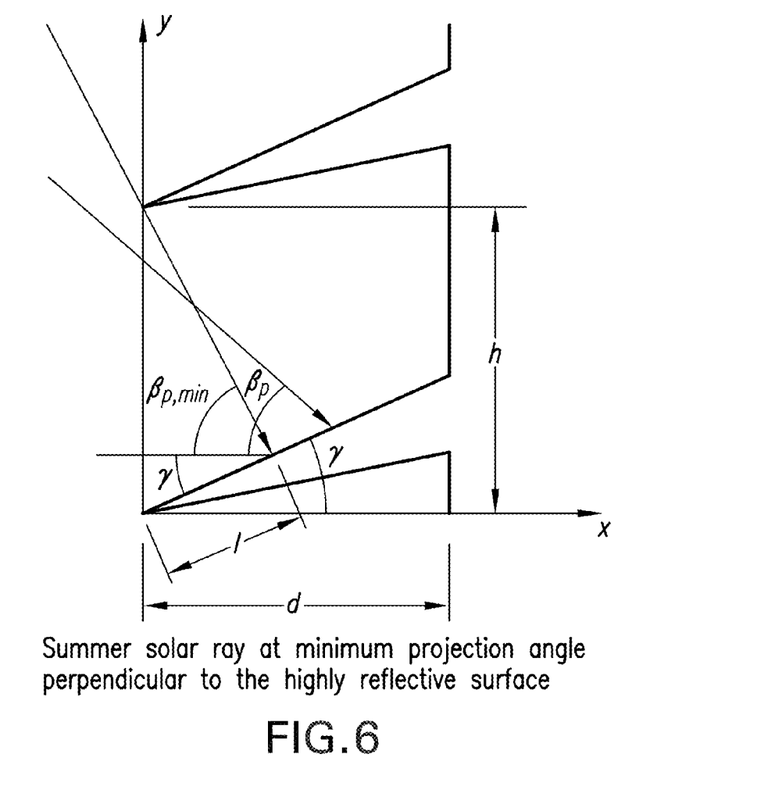
FIG. 6 is a further schematic representation of various solar ray angles.

To avoid absorption of summer solar irradiation by the tip of the cavity of the facade, the tip can be made of a highly reflective specular material, while the inner surface of the cavity is made of absorbing material. By way of further example, the tip and inner surface can be made of the same material, but with different surface finishes. For example, in some embodiments, the tip region of the cavity can have a surface finish comparable to SPI/SPE (i.e., according to the mold finishes adopted by the Society of Plastics Industry (SPI)/Society of Plastics Engineering (SPE)) surface finishes A1, A2, A3, B1, B2, B3, C1, C2, C3, or somewhat rougher, as desired; while the inner surface adjacent the tip region can have a rougher surface finish such as SPI C1, C2, C3, D1, D2, D3, or rougher, as desired. It will be appreciated that the aforementioned surface finishes correspond with particular ranges of surface roughness Ra, as are known in the art. The slope of the highly reflective segment of the groove ($\gamma$), as shown in FIG. 6, is preferably determined such that the solar ray for the minimum summer profile angle is perpendicular to its surface, i.e., $\gamma = 90 - \beta_{p,min}$. For locations proximate at latitude of 41° N, the minimum profile angle for summer months (as shown in FIG. 5) is preferably $\beta_{p,min} \approx 60°$, and consequently the slope of the reflecting surface becomes $\gamma \approx 30$. For any profile angle greater than 60°, the corresponding direct solar rays will reflect from the specularly reflecting segment of the groove away from the facade—often, toward sky and not other buildings. The best value for length of reflective segment/that assures the cooling season direct solar irradiance does not enter the cavity can be calculated via $$l = h \sin \gamma \tag{1}$$

Decisions about the value of $\beta_{p,min}$ is based on not only the latitude of location but can also be based on local heating and cooling load profiles. For example, two locations with the same latitude, but different longitudes, can have different cutoff dates for cooling and heating seasons. Having counted the average number of bounces from each surface, then the effective absorptivity can be calculated via:

$$\alpha_{eff} = 1 - \rho_t^{n_t} \rho_c^{n_s} \tag{4}$$

where $\rho_t$ and $\rho_c$ are tip and cavity reflectivities, respectively. Using $\rho = 1 - \alpha$ the above equation becomes:

$$\alpha_{eff} = 1 - (1-\alpha_t)^{n_t}(1-\alpha_c)^{n_c} \tag{5}$$

The Monte Carlo simulation used in the illustrative embodiments herein to predict the expected number of bounces from each segments of the facade, i.e., the tip and cavity, was performed based on three reflective characteristics of the cavity surface. These three reflective characteristics are fully specular, fully diffuse and partially diffuse and partially specular (real surface reflection). The tip reflectivities for all three cases were specular (due its mirror-like high reflectivity surface).

Figure 7:
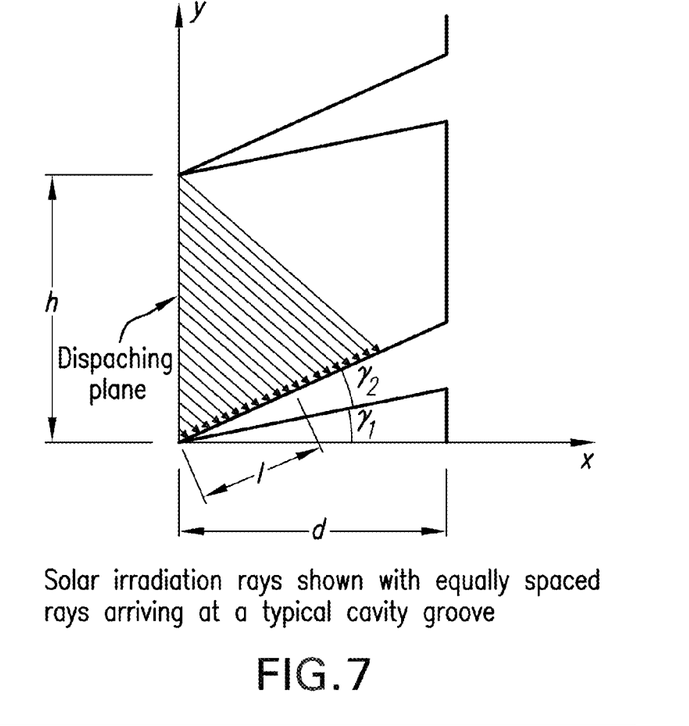
FIG. 7 is a schematic representation of incoming solar rays.

In this approach consideration is given to a single cavity cell, due to the recurring configuration of cavities in the facade. All other cavities can be expected to behave in a similar manner. Rays at a given profile angle are dispatched toward the cavity cell from the dispatching plane as shown in FIG. 7. The dispatching plane is parallel to the facade and its height is the same as the cavity cell height at its entrance segment. A large number of equally spaced parallel rays can be dispatched from this plane toward the facade. The direction of these rays is the same as the solar beam profile angle. In this analysis, only beam solar irradiation is considered, since the ground reflected and air scattered solar irradiation are relatively small.

In order to obtain accurate results, 2000 solar ray dispatches were made in the present illustrative example at each dispatching point and profile angle. Higher number of dispatches will not significantly improve the accuracy of the results while it increases the computational time considerably. The configuration considered has a depth of one and half times its height, i.e., d=1.5 h. The length of the reflecting tip is $1/3^{rd}$ of the cavity depth. Angles $\gamma_1$ and $\gamma_2$ are 5 and 25 degrees, respectively.

Figure 8:
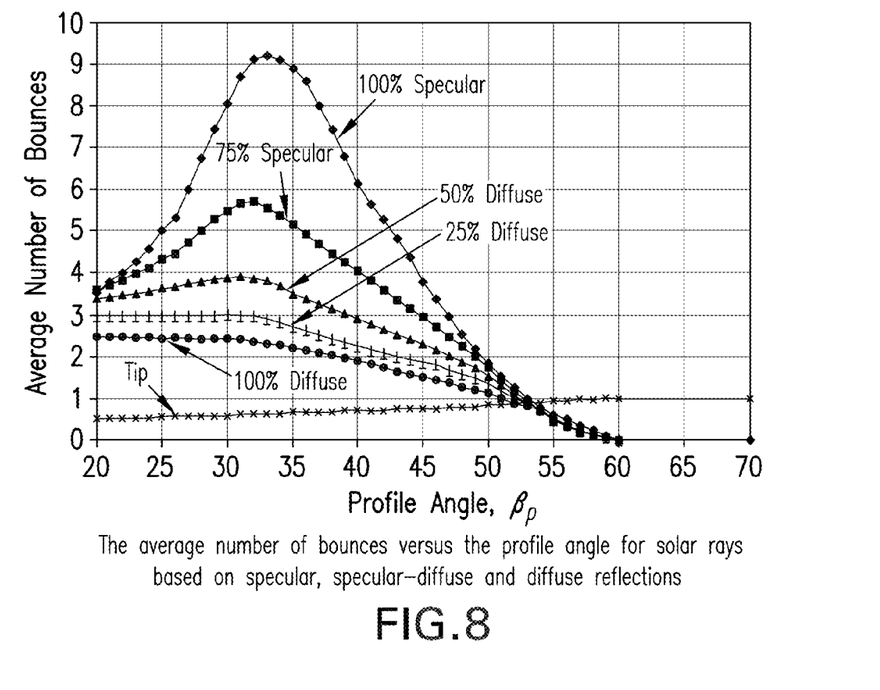
FIG. 8 is a graphical representation illustrating an average number of bounces versus profile angle for solar rays.

The resulting average number of bounces versus profile angles based on three reflection characteristics is shown in FIG. 8. The number of bounces for a given ray is an integer. In the present illustrative analysis, however, an average value of number of bounces for 2000 dispatches results in a real number. It is interesting to note that for the profile angle of 30 degrees when the surface of cavity is specular, the solar rays, in average, make about nine bounces before exiting the cavity. This is due to the fact that the upper and lower surfaces of the cavity are almost parallel and having profile angle the same as parallel surface tilt angle result in a large number of reflections between the two parallel plates when the surfaces reflect specularly. As the profile angle increases the number of bounces within the cavity decrease and ultimately approach to zero for profile angles more than 60 degrees. The tip bounces as shown in FIG. 8 are lower than one for profile angles less than 60 degrees. FIG. 8 also presents results for the other two types of cavity reflections; 50% specular-50% diffuse and 100% diffuse. The resulting average number of cavity bounces for these two cases starts with about four bounces for low profile angles and reduce as the profile angle increases.

Figure 9:
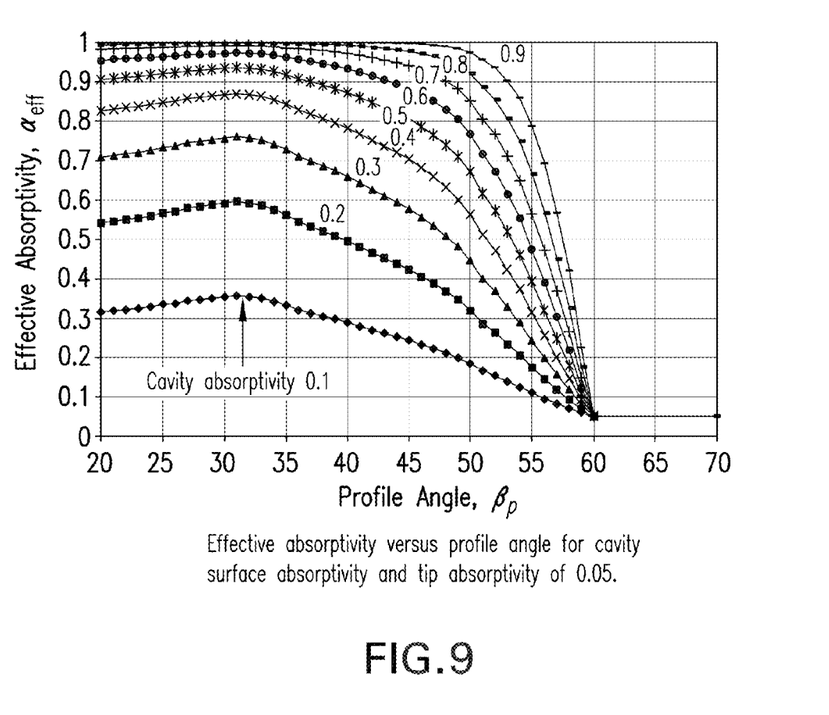
FIG. 9 is a graphical representation illustrating effective absorptivity versus profile angle for cavity surface absorptivity.

To determine the effective absorptivity based on cavity surface and the tip absorptivities, equation (5) along with the calculated the average number of bounces given in FIG. 8 is used. The resulting effective absorptivities are shown in FIG. 9, which shows large effective absorptivity for winter solar profile angles and small for summer solar profile angles. It is interesting to note that when the cavity absorptivity is larger than 0.6 the effective absorptivity remains more than 0.9 for winter months. This means that facade absorbs more than 90% of solar irradiation. Using cavity surface material with very high absorptivity (e.g. 0.9) results in an effective absorptivity of almost 1 for winter months, but also it yields a relatively large effective absorptivity when the solar profile angle is between 50 and 60 degrees, which corresponds to early or late winter months.

The number of bounces shown in FIG. 8 correspond to d/h=1.5 and the angles $\alpha_1$ and $\alpha_2$ are 5 and 25 degrees. It should be noted that deeper the cavity there is more likelihood that solar beam entered the cavity gets absorbed by the cavity surface. To investigate the effects of cavity depth on the number of bounces the value of d/h is varied with small increments from 1 to its maximum value. It should be noted that there is a limit to the depth of the cavity, not only from construction point of view, but also at some point the upper and lower surfaces of cavity meet. An exemplary limit of cavity depth can be realized from the following relation:

$$\frac{d}{h} \leq \frac{1}{\tan\gamma - \tan\gamma_1} \quad (2)$$

Figure 10:
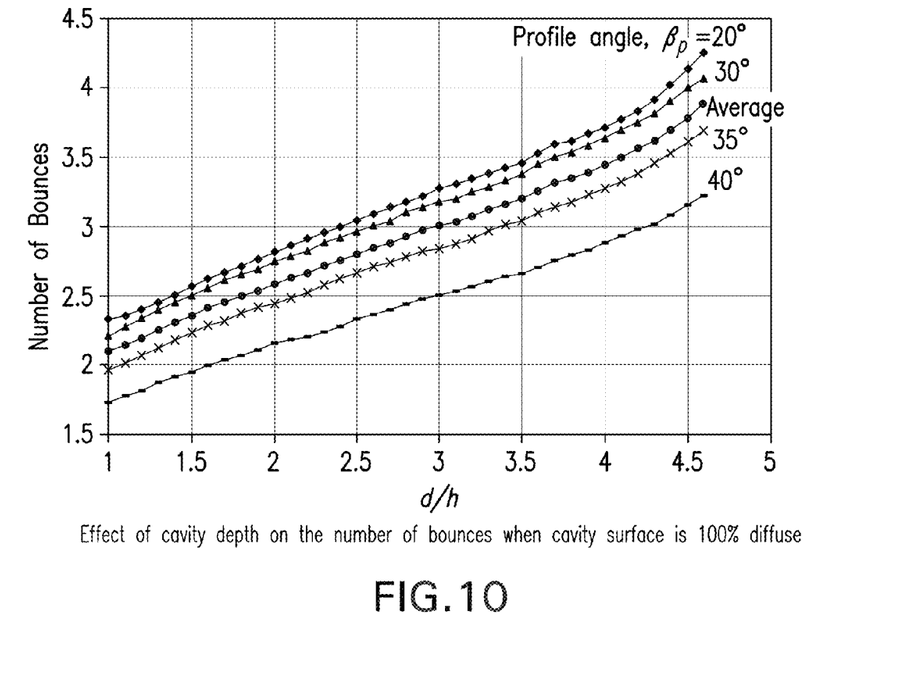
FIGS. 10-13 illustrate the effect of cavity depth on the number of reflections of an incoming solar beam based on various surface conditions.
Figure 11:
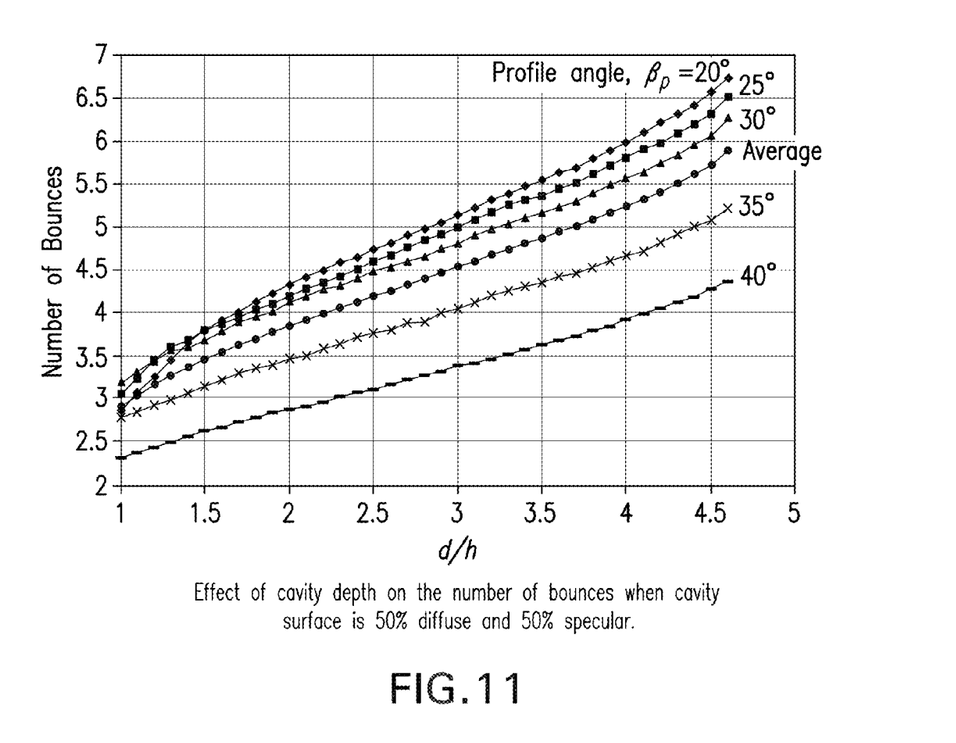
Figure 12:
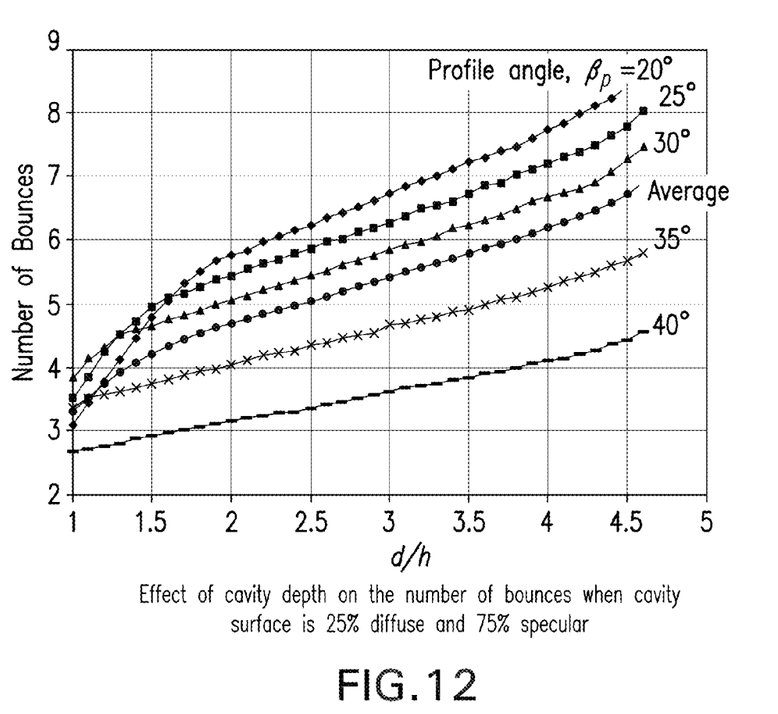
Figure 13:
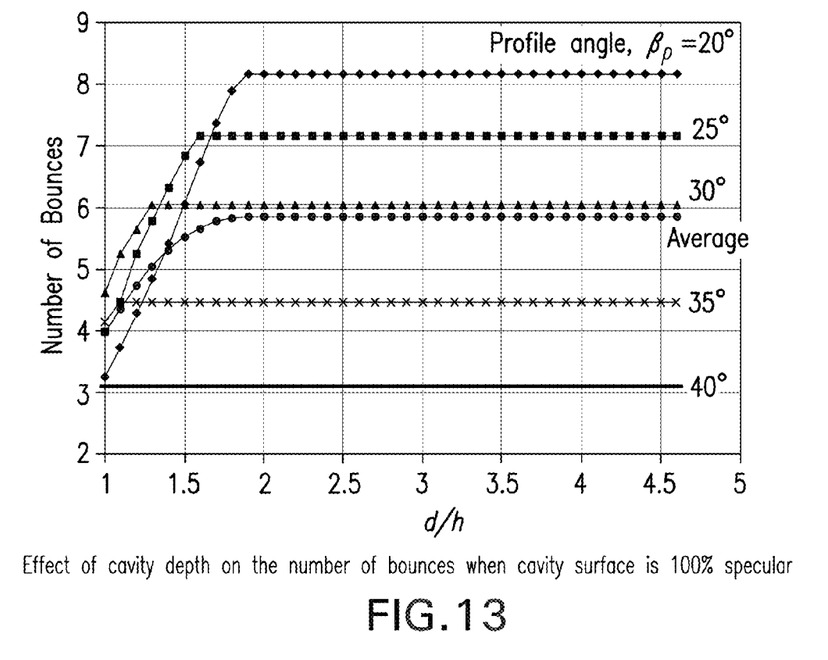

The slope of lower surface of cavity is kept at $\gamma=30°$ while angle $\gamma_2$ was increased to 10° and $\gamma_1=20°$. Based on these angles and equation (2) the maximum value of d/h becomes 4.69. The resulting expected number bounces are obtained for four cavity reflectance characteristics; fully diffuse (FIG. 10), 50% diffuse and 50% specular (FIG. 11), 25% diffuse and 75% specular (FIG. 12), and fully specular (FIG. 13). The results for all these cases show that the number of bounces increases with the cavity depth; however the rate of increase is significantly larger when the cavity surface specular component is dominated. For example, for fully specular cavities, as shown in FIG. 13, the number of bounces reaches a maximum value of eight when d/h<2 for solar profile angle of 20 degrees. As the diffuse component of the cavity reflectivity increases the number of bounces within the cavity for a given depth decreases. For example, for the solar beam at $\beta_p=20°$ to make six bounces in the cavity the value of d/h must be: 4 for 50% diffuse-50% specular; 2.3 for 25% diffuse-75% specular; and 1.5 for fully specular.

It is important to note that, as shown in Table 1, the effective absorptivity become more than 0.9 after four bounces of the solar beam—except when the cavity absorptivity is 0.3 or less. Often, surfaces with large absorptivity have a strong diffuse reflection component. It is therefore possible to construct cavities with high absorptivity surfaces ($\alpha \geq 0.7$) but fully diffusely reflective surfaces. Under this condition, based on the results in Table 1, only two bounces of the solar beam within the cavity would result in an effective absorptivity more than 0.9. Conversely, cavity surfaces can be made out of specular surfaces but low surface absorptivity ($\alpha \approx 0.3$). Under this condition larger number of reflections (more than six bounces) from surfaces of cavity is needed to yield an effective absorptivity more than 0.9. Based on the results of fully specular cavity surface, shown in FIG. 13, for solar altitude angles less than 30 degrees and cavity depth of 1.5 or more the number of bounces is more than six. It should be noted that when the solar altitude angle is around 40 degrees (corresponding to the late February and early March for Latitude of 41° N) the average number of bounces remains unchanged with slightly larger than 3, which yields an effective absorptivity of 0.66 for cavity surface absorptivity of 0.3. Hence, to make the cavities effective absorptivity more than 0.9 throughout the winter months its surface should be made of diffusely reflective coating with absorptivity not less than 0.7. Under this condition the cavity depth of 1.5<d/h<2 yield desirable number of cavity reflection to keep the effective absorptive more than 0.9.

Figure 14:
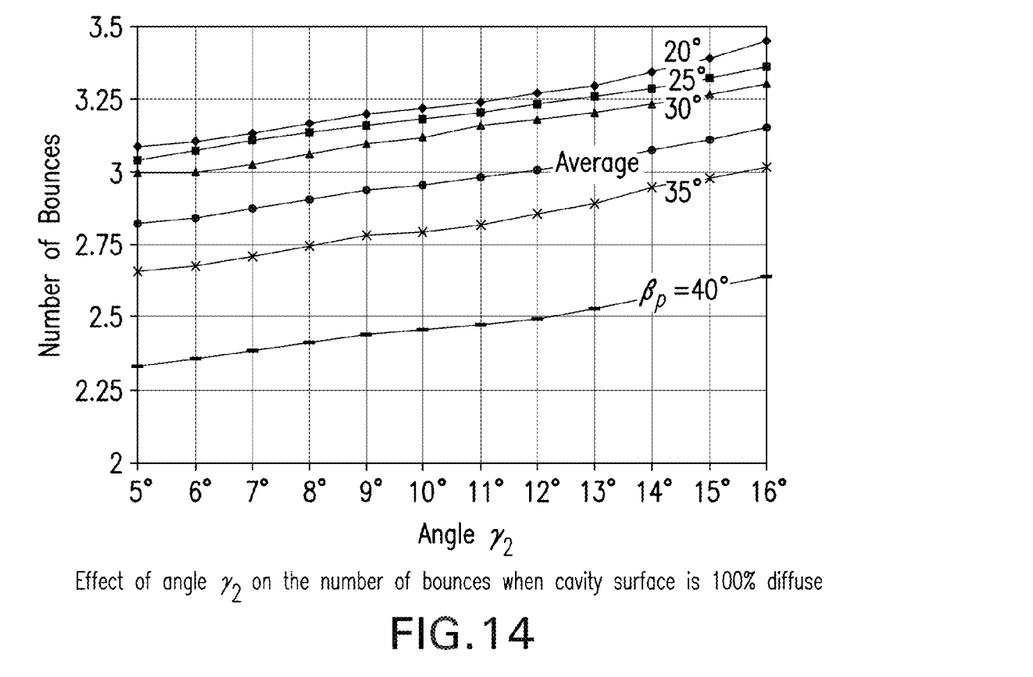
FIGS. 14-17 illustrate the effect of $\alpha_2$ on the number of reflections of an incoming solar beam based on various surface conditions.
Figure 15:
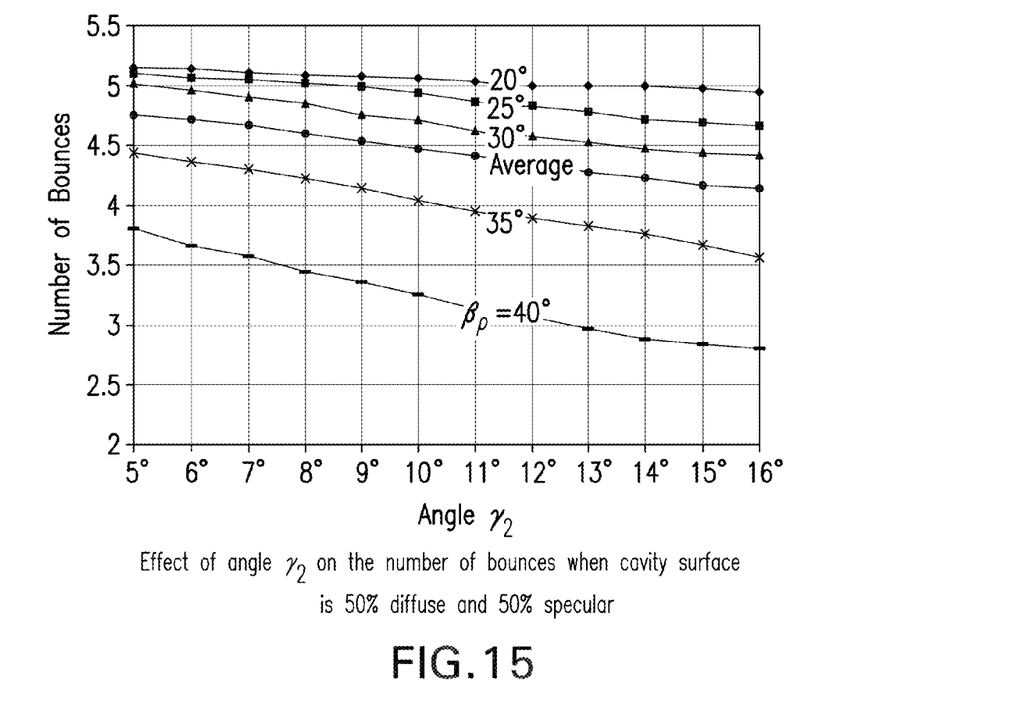
Figure 16:
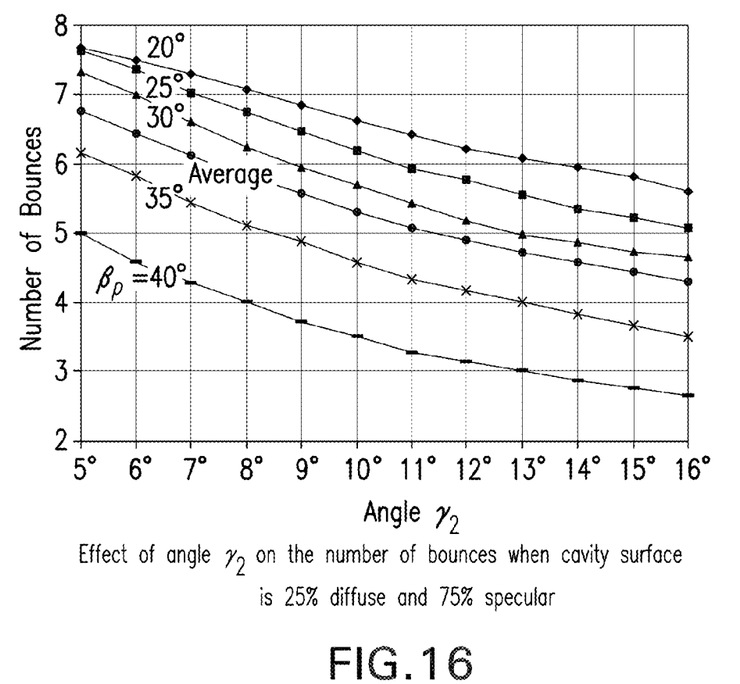
Figure 17:
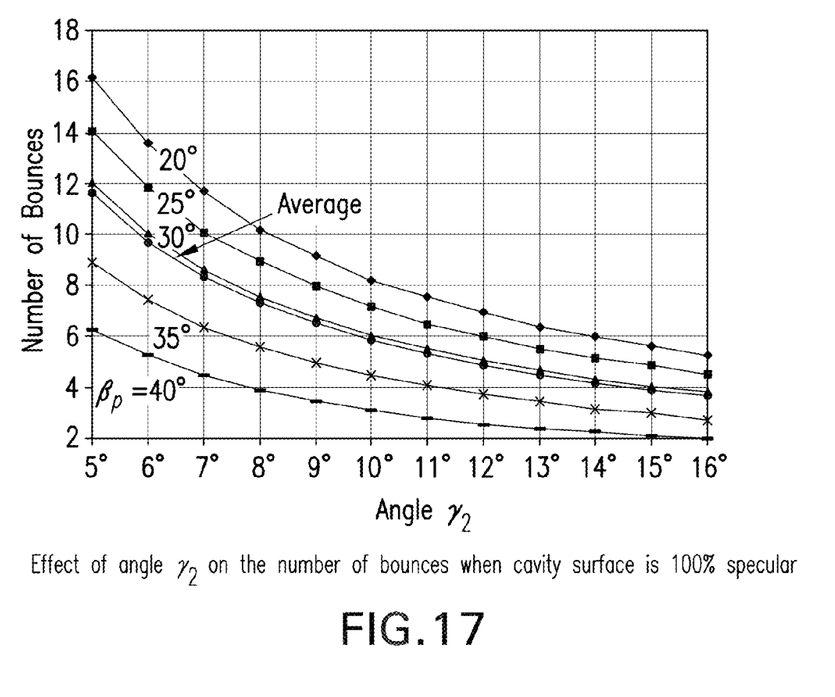

Another important variable that influences the effective absorptivity of the facade is how the value of $\alpha$ is distributed between angles $\gamma_1$ and $\gamma_2$. As discussed earlier, the summation of the two angles is determined via: $\gamma_1+\gamma_2=\gamma=90-\beta_{p,min}$. For 41° N it was determined that angle $\alpha$ must be kept at about 30 degrees to reflect all summer solar irradiation from the tip of the cavity. The question remains is "how the value of angle $\alpha$ should be distributed between $\gamma_1$ and $\gamma_2$?" From the structural and conduction heat transfer point of view, a larger value of $\gamma_2$, i.e., thicker layer of facade material between two adjacent cavities, is more advantageous. To determine the best angle between two adjacent cavities the "number of bounces" versus "angle $\gamma_2$" for four cavity surface reflectance characteristics are plotted in FIG. 14 for fully diffuse; FIG. 15 for 50% diffuse and 50% specular; FIG. 16 for 25% diffuse and 75% specular; and FIG. 17 for fully specular surfaces.

These results indicate that the specular component of reflectivity causes a decrease in the number of bounces as the angle $\gamma_2$ increases. For a fully diffuse cavity surface, as shown in FIG. 14, the number of bounces increases with angle $\alpha_2$. This trend reverses as the specular component of reflectivity becomes dominant, to the extent that for a fully specular cavity it reduces by two thirds when the angle $\gamma_2$ increases from 5 to 15 degrees. In order to make the facade material between two adjacent cavities thicker one needs to make the surfaces fully diffuse for a larger effective absorptivity. As shown in FIG. 14, for the largest value of the angle $\gamma_2$ (which is 17 degrees) the average number of bounces is more than 2.4. Having the surface diffusivity of 0.7 results in effective absorptivities significantly larger than 0.9. In fact, the average seasonal value of effective absorptivity is more than 0.97.

Although the detailed design was presented for 41° N latitude, this disclosure relates to and encompasses number of variations of the facade design. These variations can include, for example various angles of lower and upper surfaces to make the design suitable for other latitude and climatic conditions. The maximum profile angle, which is the maximum solar altitude angle at the transition date between the heating and cooling season, can be used to determine the length of reflecting tip.

Dimensions of the cavity (e.g, the height in the appended figures) can be as small, for example, as several (e.g., 5-15) microns and as large as the wall thickness of the structure will allow. The low end of the dimensional limit is provided by the wavelength of solar radiation. The cavity should be wide enough to allow solar radiation to enter the cavity. The largest wavelength of solar radiation is about 14,000 nm. Thus, the cavity may comprise grooves having a length, and a height between, for example: about 10 microns and about 20 microns, about 10 microns and about 50 microns, about 10 microns and about 100 microns, about 10 microns and about 500 microns, about 500 microns and about 800 microns, about 500 microns and about 1 millimeter ("mm"), about 3 mm and about 8 mm, about 5 mm and about 10 mm, about 5 mm and about 15 mm, about 10 mm and about 15 mm, about 15 mm and about 10 mm, about 10 mm and about 20 mm, about 25 mm and about 50 mm, about 30 mm and about 60 mm, about 40 mm and about 70 mm, about 50 mm and about 100 mm, and the like.

Figure 18:
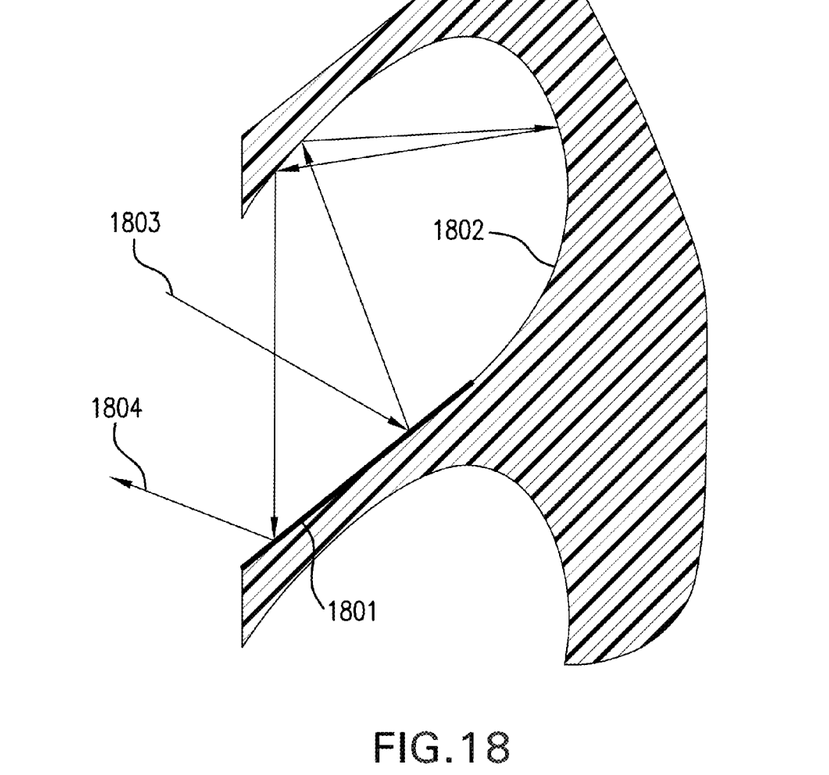
FIGS. 18-19 illustrate further aspects of embodiments in accordance with the disclosure.
Figure 19:
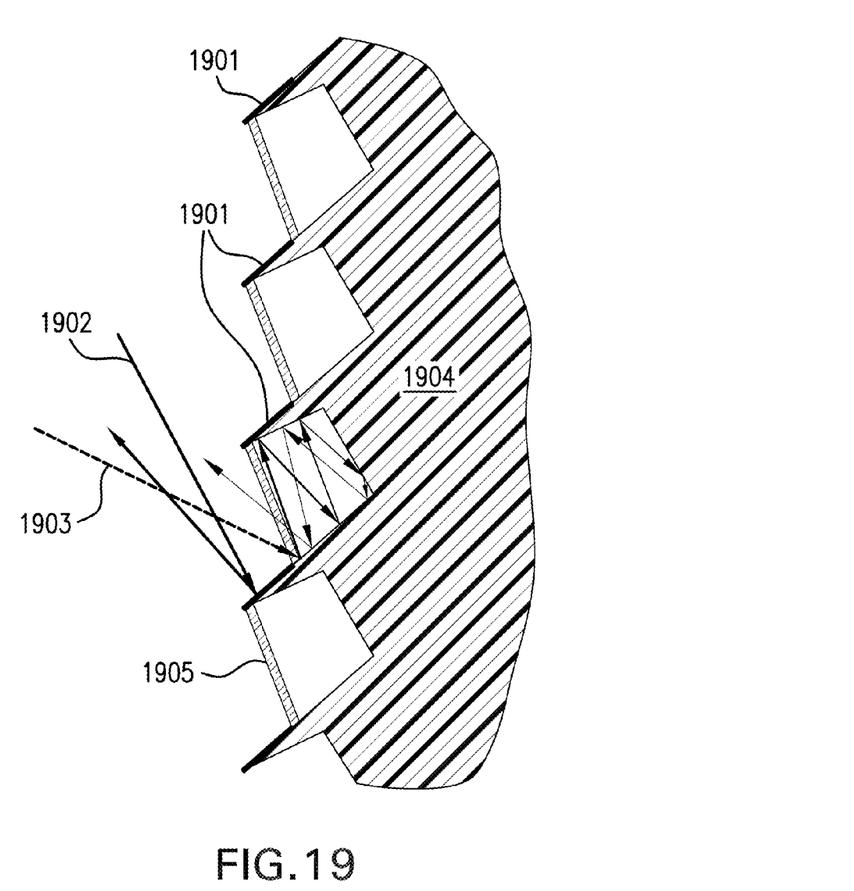

An alternative design of seasonally selective facade is based on curved surfaces as shown in FIG. 18, wherein winter solar irradiation 1803 is either reflected inwardly into the cavity to a highly absorbing surface 1802 or outwardly 1804 via a highly reflective specular surface 1801. The advantage of this design is that it has a concentrating capability for solar radiation, and has a curved cross-section 1802. It is advantageous to keep most of the absorbed solar energy at the wall surface. One way to accomplish this is to produce a greenhouse effect and trap solar energy that entered the cavity. FIG. 19 shows another version of this design, wherein winter solar irradiation 1903 is reflected inwardly into the cavity to high thermal capacity facade material 1904 and summer direct solar irradiation 1902 is reflected by via highly reflective specular surface 1901, and in which the cavity is covered by a clear glass 1905, although it will be understood that other covering materials can be used (e.g., PET plastic and the like). The clear glass 1905 (or other material) is transparent for the solar irradiance entering the cavity, but it is opaque to the re-emitted radiation resulting in trapping solar energy within the cavity.

This disclosure also encompasses a wide range of cavity configurations. Depending on the climatic condition, the configuration of the cavity can be adjusted. For a particular location the maximum solar profile angle, $\beta_{p,max}$, based the cutoff date between the heat and cooling seasons.

NOMENCLATURE d depth of cavity; h height of cavity at its opening; l length of reflecting segment
n number of bounces
Greek Symbols
$\alpha$ absorbance; $\beta$ solar altitude angle; $\phi$ solar azimuth angle; $\gamma$ slope of lower surface of cavity; $\gamma_1$ slope of upper surface of cavity; $\gamma_2$ angle of wedge between two cavities; $\rho$ reflectance
Subscripts
c cavity; eff effective; p profile; t tip
Superscript
d diffuse; s specular

REFERENCES

Each of the following references is incorporated by reference in its entirety for any purpose whatsoever: (1) 2009 ASHRAE Handbook of Fundamentals, Chapter 15, Fenestration (http://www.ASHRAEorg.); (2) Smith, G. B., Dligath, S., and Jahan, F., "Angular selective thin film glazing," Renewable Energy, Vol. 15, pp. 183-188, 1998; (3) Smith, G. B., Dligatch, S., Sullivan, R., Hutchins, "Thin film angular selective glazing," Solar Energy, Vol. 62, No. 3, pp. 229-244, 1998; (4) Hollands, K. G. T., "Directional Selectivity, Emittance, and Absorptance Properties of Vee Corrugated Specular Surfaces," Solar Energy, Vol. 7, No. 3, pp. 108-116, 1963; (5) Duffie, J. A., and Beckman, W. A., Solar Engineering of Thermal Processes, $3^{rd}$ Edition, John Wiley & Sons, Inc, 2006 (Appendix H, pp. 871-876); (6) Siegel, R., and Howell, J. *Thermal Radiation Heat Transfer*, $4^{th}$ Edition, Taylor and Francis, 2002; (7) Modest, M. F., *Radiation Heat Transfer*, $2^{nd}$ Edition, Elsevier Science, 2003.

All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Descriptions herein of computational process flows and techniques represent conceptual embodiments of illustrative software embodying the principles of the disclosed embodiments. Thus the functions of the various elements shown and described herein may be provided through the use of dedicated hardware as well as hardware capable of executing software in association with appropriate software. When provided by a processor, the functions may be provided by a single dedicated processor, by a single shared processor, or by a plurality of individual processors, some of which may be shared. The functions of those various elements may be implemented by, for example, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

In the disclosure hereof any element expressed as a means for performing a specified function is intended to encompass any way of performing that function including, for example, a) a combination of circuit elements and associated hardware which perform that function or b) software in any form, including, therefore, firmware, microcode or the like, combined with appropriate circuitry for executing that software to perform the function. Applicants thus regard any means which can provide those functionalities as equivalent to those shown herein.

Similarly, it will be appreciated that the system and process flows described herein represent various processes which may be substantially represented in computer-readable medium and so executed by a computer or processor, whether or not such computer or processor is explicitly shown. Moreover, the various processes can be understood as representing not only processing and/or other functions but, alternatively, as blocks of program code that carry out such processing or functions.

It will be apparent to those skilled in the art that various modifications and variations can be made in the systems and methods of the present disclosure without departing from the spirit or scope of the disclosure. Thus, it is intended that the present disclosure include modifications and variations that are within the scope of the subject disclosure and equivalents.

What is claimed is:

1. A seasonally selective building facade formed at least in part by a radiation absorbing portion having a surface with at least one radiation absorbing cavity defined therein, the at least one radiation absorbing cavity being defined by an upper longitudinal surface and a lower longitudinal surface that is generally parallel to the upper interior longitudinal surface, wherein:
   a) the lower longitudinal surface of the at least one radiation absorbing cavity is oriented to prevent direct solar contact with at least a portion of the at least one radiation absorbing cavity during summer months; and
   b) the at least one radiation absorbing cavity is oriented to absorb solar radiation in winter months by permitting direct solar contact with at least a portion of the at least one radiation absorbing cavity, the at least one radiation absorbing cavity being configured to permit incident direct solar radiation to undergo multiple reflections within the at least one radiation absorbing cavity between the upper and lower longitudinal surfaces during winter months.

2. The seasonally selective building facade of claim 1, wherein the at least one radiation absorbing cavity includes an exterior portion having a reflective surface configured to reflect solar radiation in summer months.

3. The building facade of claim 1, wherein the building facade is adapted and configured to reflect more direct solar radiation during summer months than during winter months.

4. The building facade of claim 1, wherein the building facade is configured to reflect a majority of solar radiation during summer months and to absorb solar radiation in winter months.

5. The building facade of claim 4, wherein the building facade is configured to reflect a majority of solar radiation during summer months and to absorb solar radiation in winter months for a latitude between about 35° N and about 45° N.

6. The building facade of claim 4, wherein the building facade is configured to reflect a majority of solar radiation during summer months and to absorb solar radiation in winter months for a latitude between about 35° S and about 45° S.

7. The building facade of claim 4, wherein the building facade is configured to reflect a majority of solar radiation during summer months and to absorb solar radiation in winter months for a latitude between about 30° N and about 35° N.

8. The building facade of claim 4, wherein the building facade is configured to reflect a majority of solar radiation during summer months and to absorb solar radiation in winter months for a latitude between about 30° S and about 35° S.

9. The building facade of claim 4, wherein the building facade is configured to reflect a majority of solar radiation during summer months and to absorb solar radiation in winter months for a latitude between about 45° N and about 55° N.

10. The building facade of claim 4, wherein the building facade is configured to reflect a majority of solar radiation during summer months and to absorb solar radiation in winter months for a latitude between about 45° S and about 55° S.

11. The building facade of claim 1, wherein the building facade has a plurality of radiation absorbing cavities.

12. The building facade of claim 1, wherein the upper and lower longitudinal surfaces converge along a direction pointing into the radiation absorbing portion.

13. The building facade of claim 1, wherein the at least one cavity has a curved cross section.

14. The building facade of claim 13, wherein the at least one cavity has a hyperbolic cross section.

15. The building facade of claim 13, wherein the at least one cavity has an undulating cross section.

16. The building facade of claim 1, further comprising a layer of transparent or translucent material covering the at least one cavity.

17. The building facade of claim 16, wherein the layer of transparent or translucent material is a plate of translucent or transparent material.

18. The building facade of claim 17, wherein the transparent or translucent material includes at least one of (i) glass and (ii) plastic.

19. The building facade of claim 1, wherein a surface of the at least one cavity has a surface that is rougher than SPI C1.

20. The building facade of claim 1, wherein the upper and lower longitudinal surfaces are joined along an interior portion of the at least one cavity by an outwardly-facing longitudinal surface.

* * * * *